US008058583B2

(12) United States Patent
Danks et al.

(10) Patent No.: US 8,058,583 B2
(45) Date of Patent: Nov. 15, 2011

(54) APPARATUS AND METHOD FOR ELECTROSLAG WELDING OF RAILS

(76) Inventors: Dan Danks, Portland, OR (US); Bob Turpin, Hillsboro, OR (US)

( * ) Notice: Subject to any disclaimer, the term of this patent is extended or adjusted under 35 U.S.C. 154(b) by 1225 days.

(21) Appl. No.: 10/893,756

(22) Filed: Jul. 16, 2004

(65) Prior Publication Data

US 2008/0061039 A1    Mar. 13, 2008

Related U.S. Application Data

(60) Provisional application No. 60/488,136, filed on Jul. 16, 2003.

(51) Int. Cl.
*B23K 25/00*    (2006.01)
*H05B 1/00*    (2006.01)

(52) U.S. Cl. ...... 219/73.1; 219/53; 219/54; 219/73.2 X; 219/137 R; 219/137.44

(58) Field of Classification Search .................... 219/53, 219/54, 55, 73.1, 137 R, 73.2 X, 145.1, 137.44, 219/120, 119, 73.11, 126, 136
See application file for complete search history.

(56) References Cited

U.S. PATENT DOCUMENTS

| | | | | | |
|---|---|---|---|---|---|
| 3,192,356 | A | * | 6/1965 | Shrubsall | 219/73.1 |
| 3,200,232 | A | * | 8/1965 | Danhier | 219/73.1 |
| 3,211,887 | A | * | 10/1965 | Cotterman | 219/73.1 |
| 3,291,955 | A | * | 12/1966 | Shrubsall et. al. | 219/73.1 |
| 3,337,712 | A | * | 8/1967 | Lucey | 219/136 |
| 4,104,504 | A | * | 8/1978 | Ridenour et al. | 219/73.1 |
| 4,208,564 | A | * | 6/1980 | Wada et al. | 219/73.1 |
| 4,413,169 | A | * | 11/1983 | Cameron | 219/73.1 |
| 4,429,207 | A | * | 1/1984 | Devletian et al. | 219/73.1 |
| 4,841,116 | A | * | 6/1989 | Kimura et al. | 219/73.1 |
| 6,166,347 | A | * | 12/2000 | Morlock | 219/54 |
| 7,041,936 | B2 | * | 5/2006 | Oberzaucher et al. | 219/130.5 |

OTHER PUBLICATIONS

Hobart Brothers Technical Center, Porta-Slag Welding, Electroslag welding—the consumable guide method, 1970, pp. 1-127, Hobart Brothers Company, Troy, Ohio, USA.

* cited by examiner

*Primary Examiner* — Henry Yuen
*Assistant Examiner* — Ket D Dang

(57) ABSTRACT

A method of welding two members together wherein welding material is melted in an electrically heated molten slag, and forms a pool of molten welding material beneath the molten slag. The end surfaces of the two members are in contact with the molten weld material and are melted to bond with the weld material.

11 Claims, 3 Drawing Sheets

APPARATUS AND METHOD FOR ELECTROSLAG WELDING OF RAILS

CROSS-REFERENCE TO RELATED APPLICATION

This application is a continuation-in-part of U.S. provisional patent application Ser. No. 60/488,136, filed on Jul. 16, 2003. The priority of the prior application is expressly claimed and its disclosure is hereby incorporated by reference in its entirety.

BACKGROUND OF THE INVENTION

This invention relates to the welding of train rails, and in particular to an apparatus and method for reliably producing strong and durable welds connecting adjacent train rails.

FIELD OF THE INVENTION

Train rails are welded together end-to-end to form tracks. It was estimated in the year 2000 that some 600,000 such welds are made annually in the course of laying new track and repairing existing tracks. The same report estimated the average cost of each weld to be about $350.

In addition to the significant cost of these welds, the two known methods of welding rails each have significant disadvantages. The first of these methods is known as "flashbutt" welding. Flashbutt welding utilizes a large, mobile power supply and extensive rail handling equipment to properly position the rails. The rail is lifted from the rail bed and clamped by conductive grips. Electrical current is passed between the two rail ends until the necessary amount of metal is melted, then the rail ends are pressed together to fuse the two molten rail ends as they cool. The process makes very good welds, and is often used in-plant because of the excellent weld quality. However, the large capital investment required, and the high consumption of rail ends in forming the weld render it impractical for field repairs or track construction.

Termite rail welding is used only in the field. A sand mold is formed around the ends of the rails to be joined. A ladle is positioned above the joint in which weld material and thermite are contained. The thermite is ignited, launching a highly exothermic reaction that melts the weld material in the ladle. Once the weld material is molten the ladle is operated to discharge the molten weld material into the sand mold. Once the liquid steel is introduced into the mold it fuses with each rail end and forms a joint in a shape defined by the mold. After cooling, the joint must be ground and shaped to its final shape to match the rail profile.

Thermite welds are relatively dirty and experience a relatively high fatigue failure rate. The poor weld quality results from the fact that the thermite reaction is not controllable once initiated, and temperature and composition of the molten steel used to form the weld varies.

BRIEF SUMMARY OF THE INVENTION

This invention provides an improved method and apparatus for welding rails by utilizing a process known as electroslag welding ("ESW"). ESW is a single pass, arcless welding process wherein heat is generated by resistance heating resulting from the passing of a large electrical current through a molten flux pool positioned atop the metal that is used to form the weld. As the weld progresses, the void between the rails and the cooling shoes is filled. Solidification starts in the starting block and follows the weld as it progresses upward, terminating in the runoff blocks. Because the entire weld is completed in a single heating cycle, or pass instead of multiple passes, it is particularly well suited to irregularly shaped and/or thick components.

The method and apparatus of this invention provide numerous advantages over the flashbutt and thermite rail welding processes, including:

ESW uses common welding equipment;
there is little or no consumption of rails during the welding process;
fewer contaminant inclusions in the weld than with thermite;
relatively rapid method of welding rails;
flexible set-up conditions that can be accommodated under field conditions;
minimal operator skills required;
competitive cost per weld;
fully documentable weld quality parameters;
easily inspected by common quality assurance methods; and,
the process can be automated to some extent.

These and other advantages of the invention will be described by reference to the following figures and description of preferred embodiments of the invention.

DETAILED DESCRIPTION OF THE PREFERRED EMBODIMENT

Figure 1:
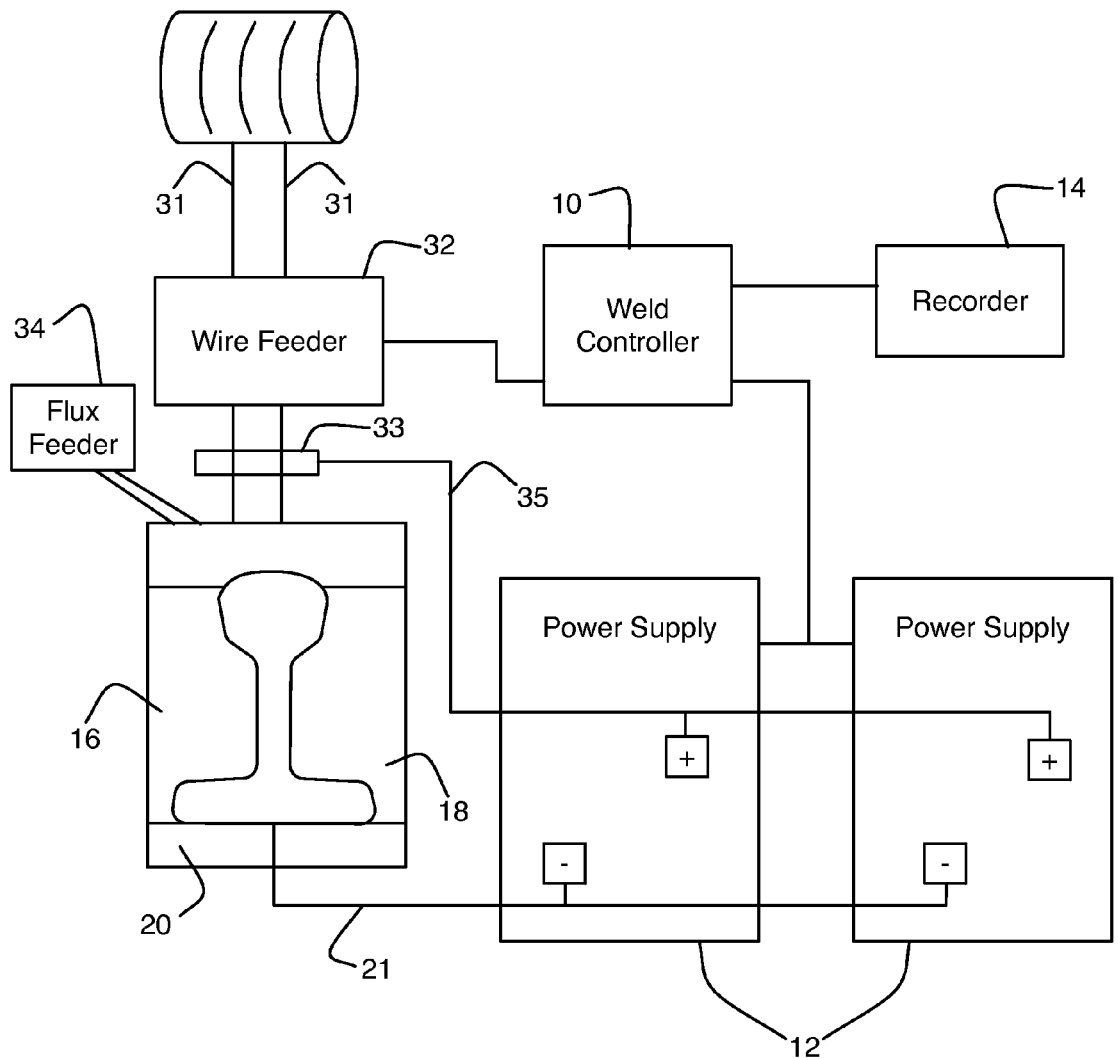
FIG. 1 is a schematic diagram illustrating the components of an apparatus for welding according to one preferred embodiment of the invention.

Turning now to FIG. 1, an apparatus for performing a weld according to a preferred embodiment of the invention will be described. A weld controller 10 provides control of the current output of one or more power supplies 12. An optional recorder 14 is in communication with controller 10 to provide documentation of process conditions for quality control and weld certification requirements if applicable. A pair of cooling shoes 16 and 18 are placed together atop a base plate or starting block 20, forming a void in the cross-sectional shape of the rails (and the weld to be formed). The cooling shoe system consists of several components. Any combination can be made to construct the start block under the rail base, the side shoes that mate to the top of the rail base, web and top of start block, the rail head portion and the weld runout area. For example, it is possible to make the side, rail head and runout sections two components, one for each side of the rail. These could then fit closely to the top of the start block which can be a single unit positioned under the rail base. Conversely, the side portion could be separated for the rail head and runout areas if it is more convenient for the operation of the system.

The cooling shoes perform several functions. They contain the molten slag and weld metal in the joint until they cool and solidify. They determine the amount and shape of weld metal reinforcement that is present at the weld conclusion. They can take many forms but their basic function requires that they conform to shape of rail so no leakage of high temperature fluids can escape from the weld zone. For example, they can be constructed of material that is conductive in nature to increase the rate of heat removal. Copper is the most commonly selected material. They can be water or air cooled. Additional heat flow controlling options include a Thermal Barrier Coating (TBC) lining, variable cooling fluid controls, or constructed so they are passively cooled by ambient air surrounding the shoe. They can also be constructed such that heat is selectively removed where necessary to optimize the weld and rail properties. For example, preferential cooling around the rail head, aids in producing higher hardnesses on the rail running surface that contacts train wheels. Likewise, it may be advantageous to retain heat where beneficial, for example in the rail web and base, to improve the toughness in those regions. They can also be designed to removed immediately at the conclusion of the weld so proper cooling rates are achieved by exposing the just-completed weld to ambient air.

Starting block 20 performs several functions. It serves as a sump in which the weld is initiated and therefore contains the molten slag and metal at during the initiation of the weld. As the location of the weld initiation it contains and concentrates the initial heat generated by the electrical energy. This heat concentrating function minimizes the time and travel distance required to achieve the temperatures for a sound weld when the liquid slag and steel reach the rail base. A second function is that some part of the start block must provide the conductive path for the electrical welding energy to pass from the electrodes delivered through the guide tube to the rail which is grounded. A ground lead 21 from the power supply 10 is connected to starting block 20. The start block, then, must be electrically conductive yet thermally insulating. A third purpose of the start block is to seal against the rail base and adjacent side cooling shoes to prevent the weld liquids from leaking as the weld progresses from the sump into the rail base. For start blocks that are reusable there is consumable component placed in the sump directly below the electrodes and guide tube. This insert protects the reusable start block from direct arc impingement at the initiation of current flow.

Important features of the start block are the depth below the rail base, the merge angles where the block contacts the rail base, the width of the cavity past the rail base which becomes the weld reinforcement when the start block is removed.

To fulfill the requirements the start block can be composed of several materials. The most common is copper with a consumable steel insert. However, properly insulated and cooled steel can be used. In addition ceramic liners can be inserted into steel or copper start sumps. Another option would be to construct the start sump entirely of a ceramic or sand mold that is used for only one weld.

Figure 3:
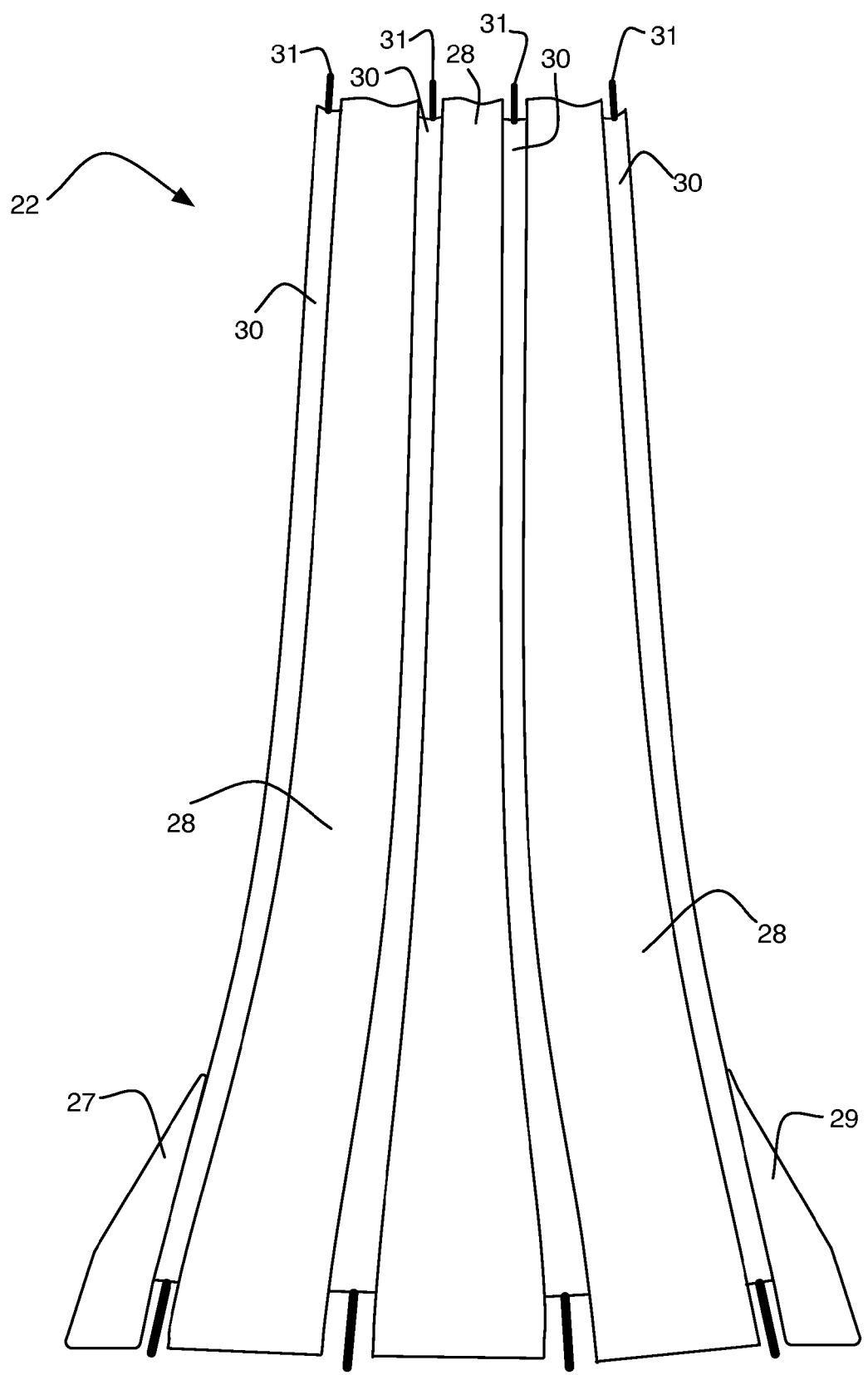
FIG. 3 is a side elevational view of a wire guide plate according to a preferred embodiment of the invention.

The ends of the rails to be welded are placed in the cooling shoes, and spaced apart from about 0.5" to 1.5", with about 1" being preferred. A wire guide 22 is placed between the rail ends. Referring to FIG. 3, wire guide 22 is a generally planar, steel assembly that includes guide tubes 24 through which wire electrodes 26 are fed into the void between the rail ends and melted to form the weld. In one preferred embodiment shown, wire guide 22 is shaped generally like the cross-sectional shape of the rail. It is formed from a plurality of 3/16" steel plate web members 28 separated by 3/16" by 0.049" wall seamless guide tubes 30. A pair of wings 27 and 29 are provided on the lower portion to correspond to the cross-sectional shape of the rails ends. Web members 28 and guide tubes 30 are preferably formed from a combination of steels including, but not limited to, 1004, 1040, 4340, 1080, or 1095 steel, which is melted and integrated into the weld as will be described below in greater detail. Wire guide assembly 22 can be formed in other configurations, such as placing the tubes between a pair of spaced-apart plates, or other alternative designs.

Referring again to FIG. 1, a wire feeder 32 is positioned above the cooling shoe assembly, and feeds multiple electrode wires 31 through a positive electrode 33 and guide tubes 30 into the space between the rail ends. Any commercially available electrode drive system that adequately moves the desired number and diameter electrodes at the proper speed is acceptable. This includes but is not limited to single and multi-wire diameter that handle 1/16" to 1/8" diameter electrodes.

The rate of wire feed into guide tubes 30 is controlled by controller 10, as is the flux feed rate from flux feeder 34. The positive lead 35 from power source 12 is connected to positive electrode 33, and thereby provides power to the electrode wires.

Figure 2:
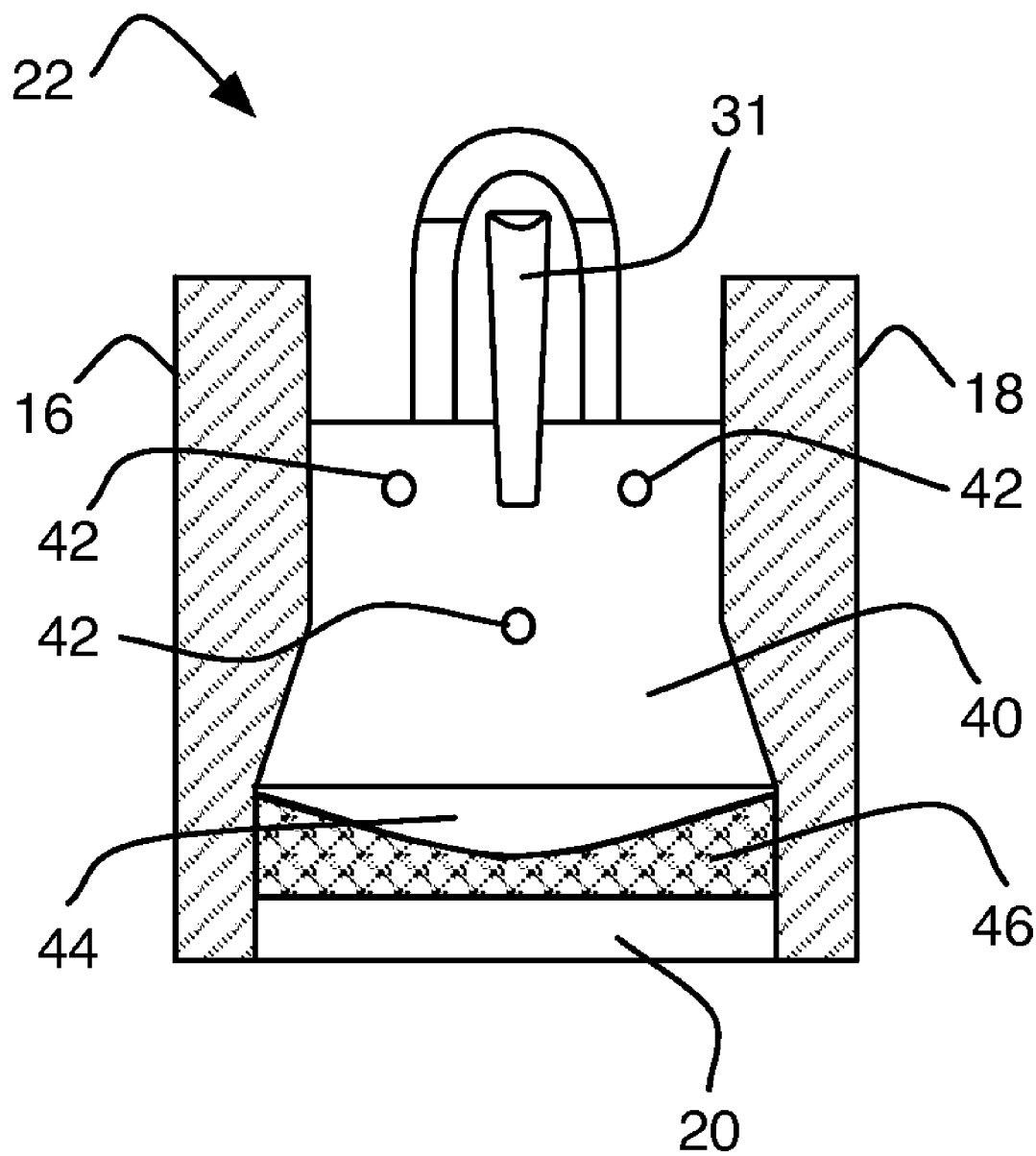
FIG. 2 is a schematic cross-sectional view showing the weld being formed, and showing the major mechanical and electrical components, and the indicating the current flow during the forming of the weld.

One preferred method of forming a weld will now be described with reference to FIGS. 1-3. The rail ends to be joined are positioned in the cooling shoes 14 and 16 approximately an inch apart. A wire guide 22 is positioned between the rail ends. Copper cooling shoes 14, 16 and base plate 20 are clamped to the sides, bottom and top of the rail ends, and hold the ends in position and also contain the molten slag and molten metal during the welding process.

After the components are assembled, and initial charge of flux is placed in the void. Power is applied and the wire is fed through the guide tubes. When the electrode wires approaches base 20 there is momentary arcing which melts the granulated flux, forms a molten slag pool 40 that extinguishes the arc. (FIG. 3) The consumable wire guide 22 directs the electrode wires 31 and conducts the welding current to the molten slag pool 40. The electrical resistance of the slag pool 40 generates heat which melts the electrode wires 31, wire guide 22 and the ends of the two rails to be joined. As the wire and guide tube are melted by the flux the liquid metal 42 sinks through the molten slag 40 to the molten metal pool 44 below and solidifies to form weld 46. The molten slag 40 is less dense than molten metal 42 and floats atop molten metal pool 44 and shields it from exposure to air. As the electrode 31 is continuously fed into the gap, the gap, is filled with molten metal and solidification occurs immediately below the liquid pool. When the gap is completely full, including the runout blocks, power is cut and the remainder of the liquid metal solidifies. Cooling shoes 14 and 16 are unclamped and removed, and the weld is completed by removing the weld reinforcement by any appropriate method including shearing, burning, and grinding. Sufficient reinforcement is removed to provide a smooth running surface for train wheels and to permit handling of rail for future maintenance.

Advantages of the invention for field rail welding include very clean weld metal, improved control of the properties and dimensions of the heat affected zone of the rails, and the ability to provide different chemistries and therefore properties in different areas of the weld (by varying the composition of the wire guide. Thus, the weld can have any desired tensile strength. Preferably, the tensile strength of the weld is between 125,000 psi and 400,000 psi. The process requires less operator skill and dexterity than prior art methods, and is relatively portable and economical compared to flash-butt welding. The high heat input associated with the invention could be considered a disadvantage. However, if properly controlled the high heat input can be helpful because relatively slower cooling rates form the desired softer, pearlitic microstructure. Microstructure specimens from test welds were prepared by bandsawing a sample from the appropriate location, mounting and polishing with standard metallographic techniques, etching with 1% nital and examining on an optical metallograph at magnifications up to 1000×.

Another advantage of the invention is that an almost limitless combination of chemical compositions is possible. The composition can be modified by constructing the guide tube of desired materials. In addition, any combination of electrode wire can be used. The methods of the invention can be used to form welds using nickel based weld metal, plain carbon steels ranging from low to high carbon, and iron based chemistries alloyed with molybdenum, nickel and chromium. Single welds can consist of varying compositions depending on the desired properties at different locations in the weld, for example low carbon at the rail base and higher carbon at the rail head (running surface). In general the composition of the electrode wire includes nickel 2.5 to 99% nickel, between 0.04 and 0.8% carbon, 1% Mn; 1% Si, and the balance Fe, although the invention is not limited to any specific weld composition.

Following is an example of the use of the method of this invention to form a weld between to rail ends.

1. Prepare rail ends to be joined by grinding or similarly cleaning heavier oxide surfaces and smoothing larger surface roughness features.

2. Clear an area under the joint large enough to position the start block.

3. Position the rails ends approximately ¾" apart plus or minus ¼".) The rails should be aligned in horizontal and vertical planes with a slight crown (approximately ¼") at the joint. The crown is not critical for a good weld but usually improves rail alignment after the weld.

4. Position and install the start block under the rail bases, bridging the weld gap. Insert heat resistant ceramic tape if the gap between the rail base and the block exceeds ⅛". If the start block utilizes a start tab, insure that the start tab is located directly below the center of the joint where the wire electrodes will impinge in the start block. Also insure that start tab contacts the both rails and forms an electrical current path to the rails.

5. Position and clamp the guide tube in the guide tube clamp located over the weld gap. Align the guide tube so it is parallel to the rail end faces and parallel with the vertical plane of the rail.

6. Feed the welding electrode (wire) into the tubing in the guide tube. Stagger the wires so the wire ends are separated approximately 2" vertically. This causes arcing at the weld start to be sequenced along the joint rather than starting at all the wires at the same time.

7. Position and install the side cooling shoes. Insure the weld reinforcement void is aligned with the rail gap and the opposite side shoe. Clamp into place. Insert ceramic tape in all areas where the gap between the cooling shoe and rail exceeds ⅛".

8. Position and install the runout blocks on the rail head. The runout blocks should also be aligned with the side cooling shoes. Use ceramic tape if necessary.

9. Pour approximately 150 grams of the 400 gram total flux into the gap between the rails.

10. Depending on if preheating is used and what type, it may be beneficial to preheat prior to the installation of some or all of the cooling shoes. Preheating can be performed with oxyfuel systems or electrical induction heating equipment.

11. Positioning and placement of cooling shoes, start and runout blocks, guide tube and preheating equipment can be accomplished either with mechanized systems (robots that automatically locate and fix the cooling shoes, guide tube, welding electrode, preheating components) or by manual methods of locating and clamping or fixing the appropriate components in the correct location in the right sequence.

12. Grounding cables are attached to the rails on either side of the weld at convenient locations proximal to the immediate welding area. A suitably sized clean metal spot can be ground on the rail to improve the electrical contact with the grounding cable and minimize any arc strike effects.

13. The welding process is initiated with the appropriate controls on the welding machine controller which also coordinates the electrode delivery (number of electrodes, electrode speed, sequence of electrode delivery) and the application of appropriate electrical power (voltage, amperage). Starting voltage is approximately 34 volts, electrode speed is approximately 120 inches per minute when using 4 wires. If more or fewer wires are used the speed should be adjusted so the total wire volume delivery rate is equivalent to four at 120 inches per minute.

14. The welding continues from the start block below the rail base up through to the rail head and into the runout blocks. The remaining flux is added as required either manually or automatically depending on the system setup to maintain optimum current stability.

15. Welding parameters are changed as the weld progresses. Voltage is decreased and electrode speed (and therefore amperage) is increased. Near the end of the weld parameters are approximately 28 volts, 230 ipm and 1200 amperes respectively.

16. Cooling is initiated either prior to the weld start or at the appropriate time depending on the type of cooling system employed. At the completion of the weld (when the runout reinforcement is filled) the welding sequence is stopped which discontinues the electrode delivery, application of electrical power. Cooling can be discontinued at this point also or it can be continued as required by the type and degree of cooling required.

17. After the weld has cooled appropriately the cooling shoe system is removed and the reinforcement can be removed also by the most expeditious means including but limited to shearing, flame cutting, abrasive grinding. Only the reinforcement that would interfere with rail performance and maintenance need be removed, other non-interfering reinforcement can be removed or left in place as desired.

Welding parameters at the start of the weld are 34 volts, approximately 1000 amperes and wire speed approximately 120 inches per minute. As the weld progresses voltage is slowly decreased and wire speed increased to 28 volts and 230 ipm respectively. Amperage increases proportionately to the wire speed.

About 150 grams of flux is added prior to the weld start and 50 grams per minute are added continuously thereafter for the duration of the weld. The flux can be added by either manual or automated systems.

A weld formed by the foregoing example has been found to embody desirable chemical and physical properties, and can be conducted reliably and economically.

Those of skill in the art will recognize that although the invention has been described by reference to preferred embodiments, the embodiments described are illustrative and not intended to limit the invention. Numerous changes and modifications in arrangement and conditions are possible without departing from the scope of the following claims.

What is claimed is:

1. A method for joining a first rail member and a second rail member comprising the steps of:
providing a first metallic surface of the first rail member spaced apart from a second metallic surface of the second rail member, wherein the first rail member and the second rail member are substantially aligned and are provided with a crown at a joint between the first rail member and the second rail member;

placing a first side member, a second side member, and a base member around the first metallic surface and the second metallic surface to define a void between the first metallic surface and the second metallic surface;

placing a wire guide between the first metallic surface and the second metallic surface, wherein the wire guide includes a first elongate passageway and a second elongate passageway;

placing a flux material in the void and adjacent to the wire guide;

providing a first electrode and a second electrode between the first metallic surface and the second metallic surface, wherein the first electrode is provided in the first elongate passageway and wherein the second electrode is provided in the second elongate passageway, and wherein the first electrode and the second electrode have different compositions;

passing an electrical current through the first electrode and the second electrode and feeding the first electrode and the second electrode having different compositions, wherein the first electrode includes about 2.5% nickel and about 0.04% carbon, wherein the second electrode includes about 99% nickel and about 0.8% carbon, wherein the first electrode and the second electrode being staggered vertically causes a weld start to be sequenced along the joint, and wherein the electrical current causes a molten slag to be formed from the flux material;

feeding, during a weld process, the first electrode and the second electrode having different compositions simultaneously into the molten slag;

feeding, during the weld process, a third electrode and a fourth electrode, wherein the first electrode, the second electrode, the third electrode and the fourth electrode are fed at a speed in the range of about 120 inches per minute to 230 inches per minute;

forming a pool of molten weld-forming material beneath the molten slag and in heating contact with the first metallic surface and the second metallic surface; and, solidifying the molten weld-forming material to form a weld.

2. The method of claim 1, further comprising:
cooling the first side member, the second side member, and the base member.

3. The method of claim 1, wherein said forming the pool of molten weld-forming material comprises melting at least a portion of the first rail member and the second rail member.

4. The method of claim 1, wherein the wire guide comprises a consumable wire guide.

5. The method of claim 1, wherein the weld comprises a varying chemical composition throughout the weld.

6. The method of claim 5, wherein the varying chemical composition comprises at least one of nickel, carbon, molybdenum, chromium, manganese or silicon.

7. The method of claim 1, wherein the crown at the joint between the first rail member and the second rail member is about a quarter of an inch.

8. The method of claim 1, wherein the first side member comprises copper.

9. The method of claim 1, further comprising:
providing a weld runout area.

10. The method of claim 1, further comprising:
preparing the first metallic surface by grinding the first rail member.

11. The method of claim 1, wherein the wire guide comprises a weld-forming material.

* * * * *